Dec. 18, 1951
G. ZINT
2,578,771
TYPEWRITER FOR WRITING CONTINUOUSLY
IN OPPOSITE DIRECTIONS
Filed Oct. 28, 1948
6 Sheets-Sheet 1
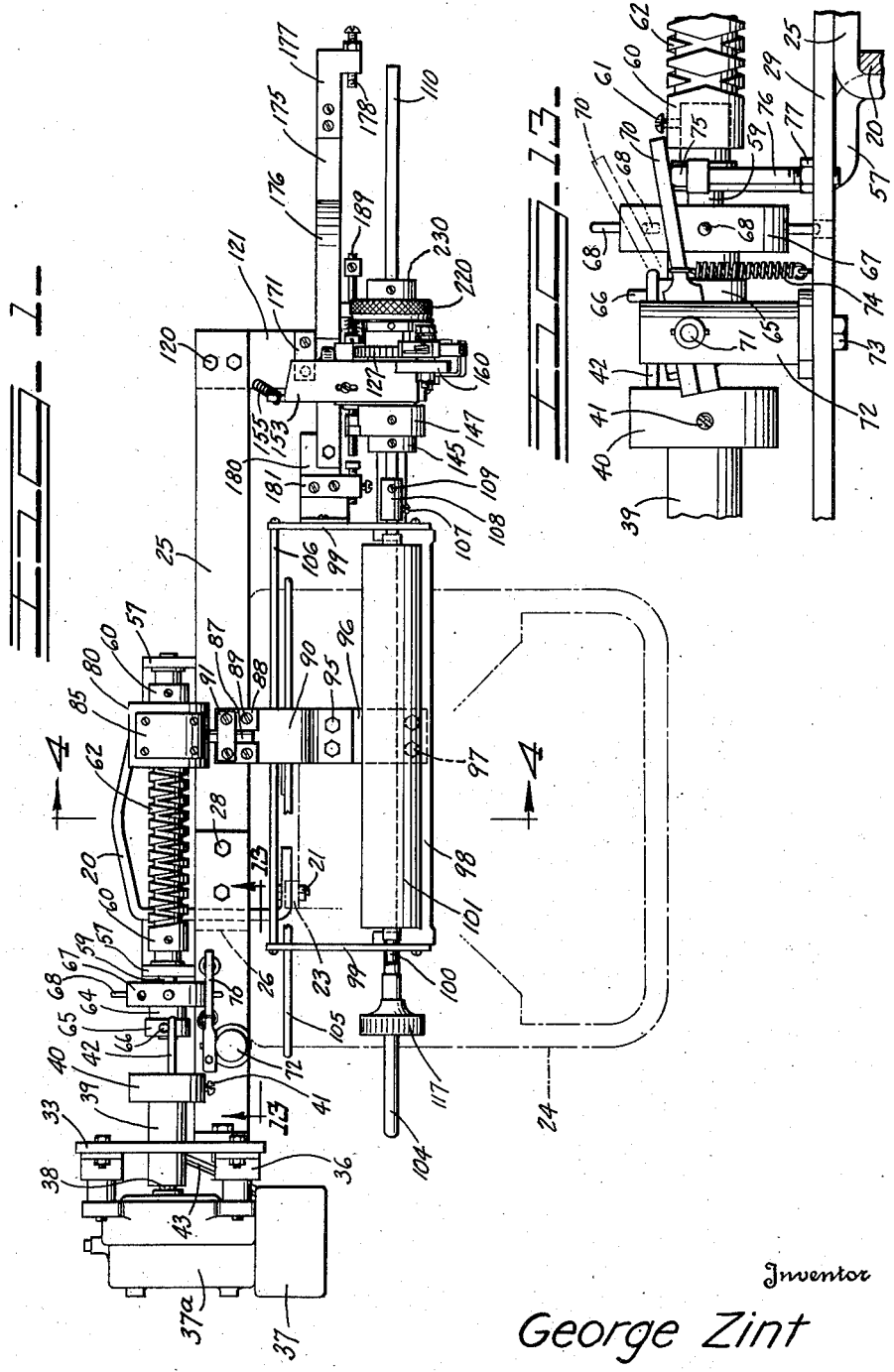
Inventor
George Zint
Attorneys

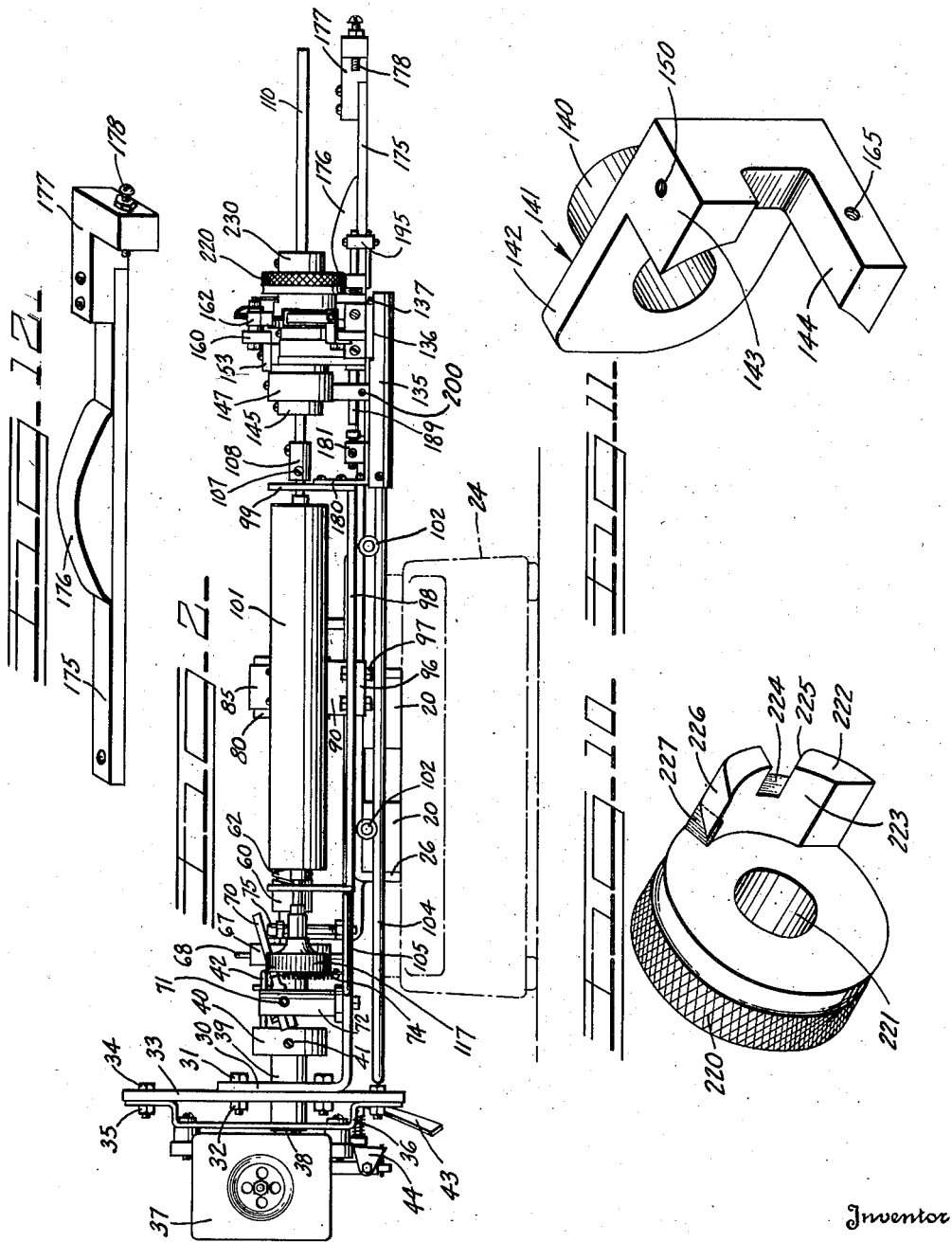

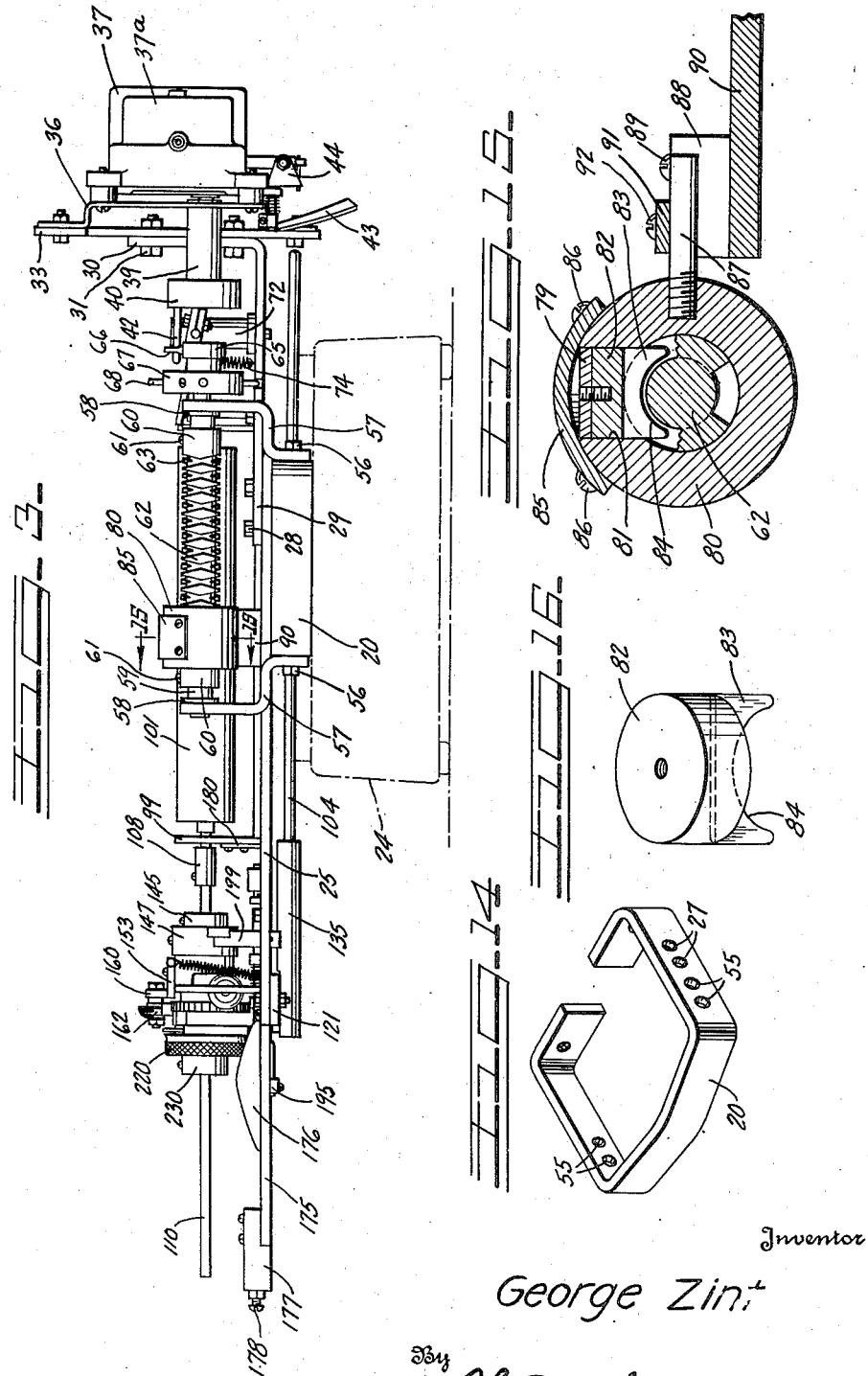

Dec. 18, 1951  G. ZINT  2,578,771
TYPEWRITER FOR WRITING CONTINUOUSLY
IN OPPOSITE DIRECTIONS
Filed Oct. 28, 1948  6 Sheets-Sheet 4
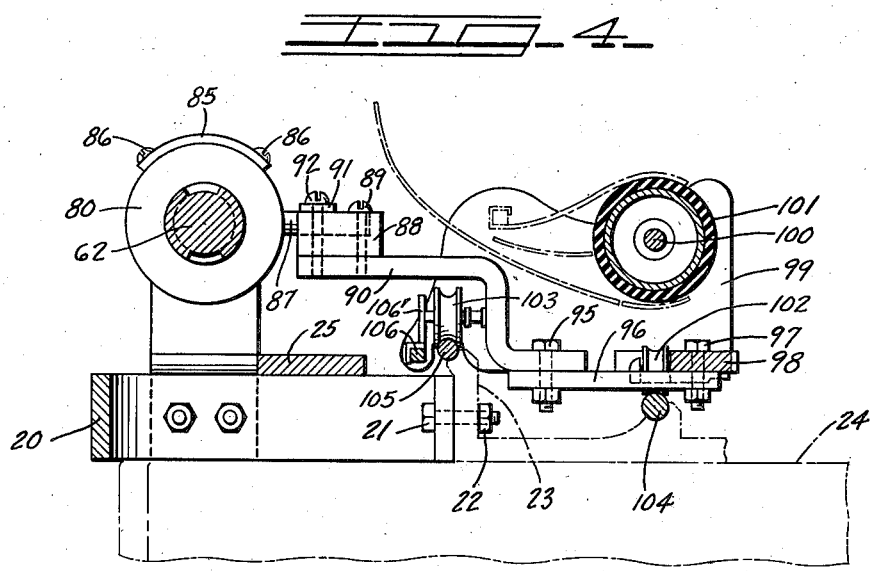
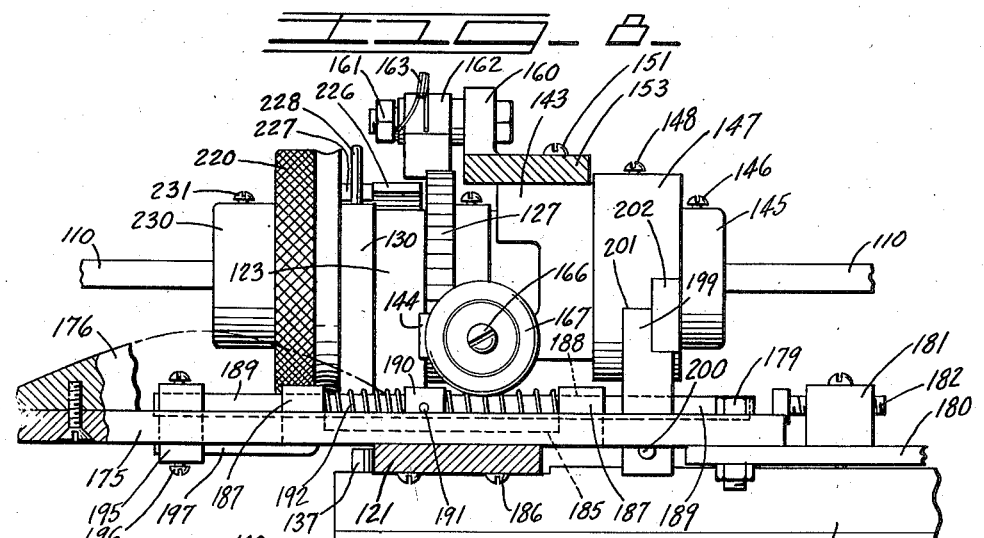
Inventor
George Zint
Attorneys Dec. 18, 1951 — G. ZINT — 2,578,771
TYPEWRITER FOR WRITING CONTINUOUSLY IN OPPOSITE DIRECTIONS
Filed Oct. 28, 1948 — 6 Sheets-Sheet 5
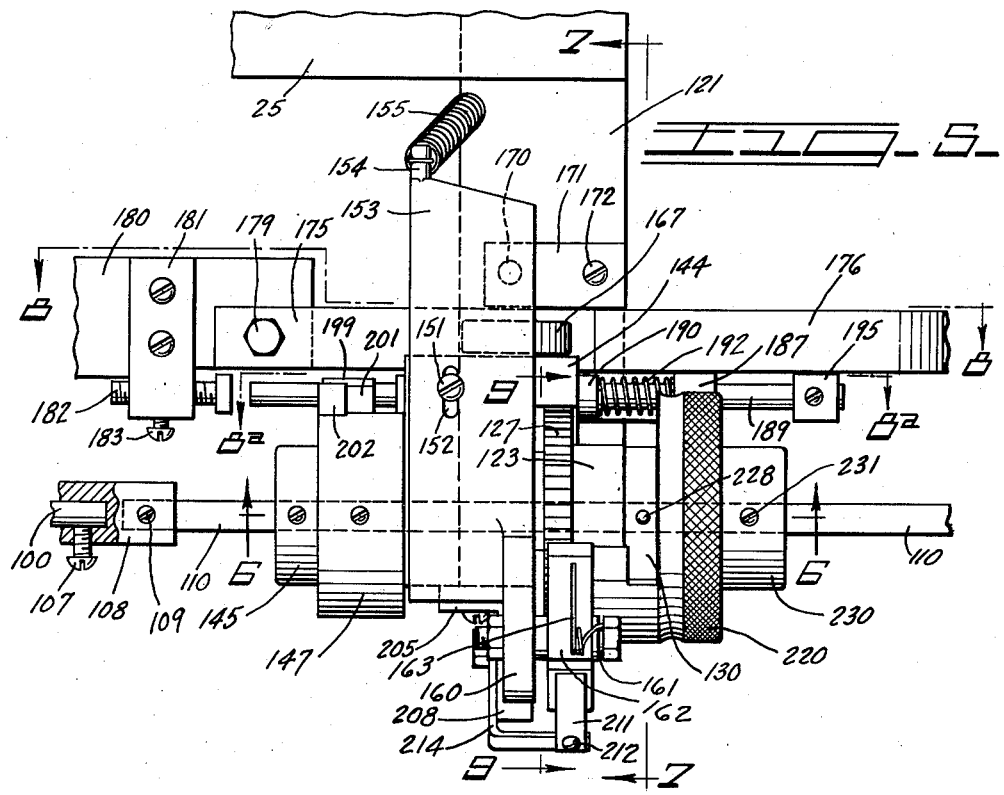
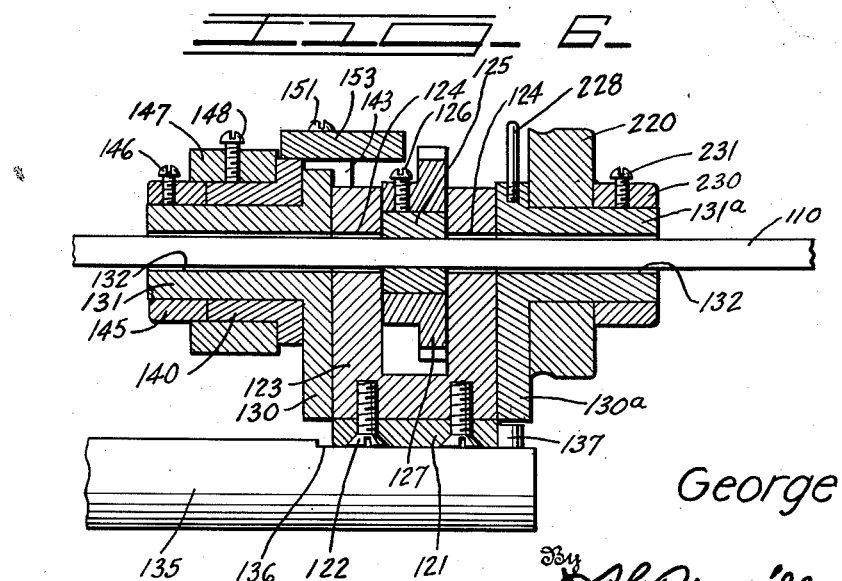
Inventor
George Zint
By H.R. Willson & Co.
Attorneys

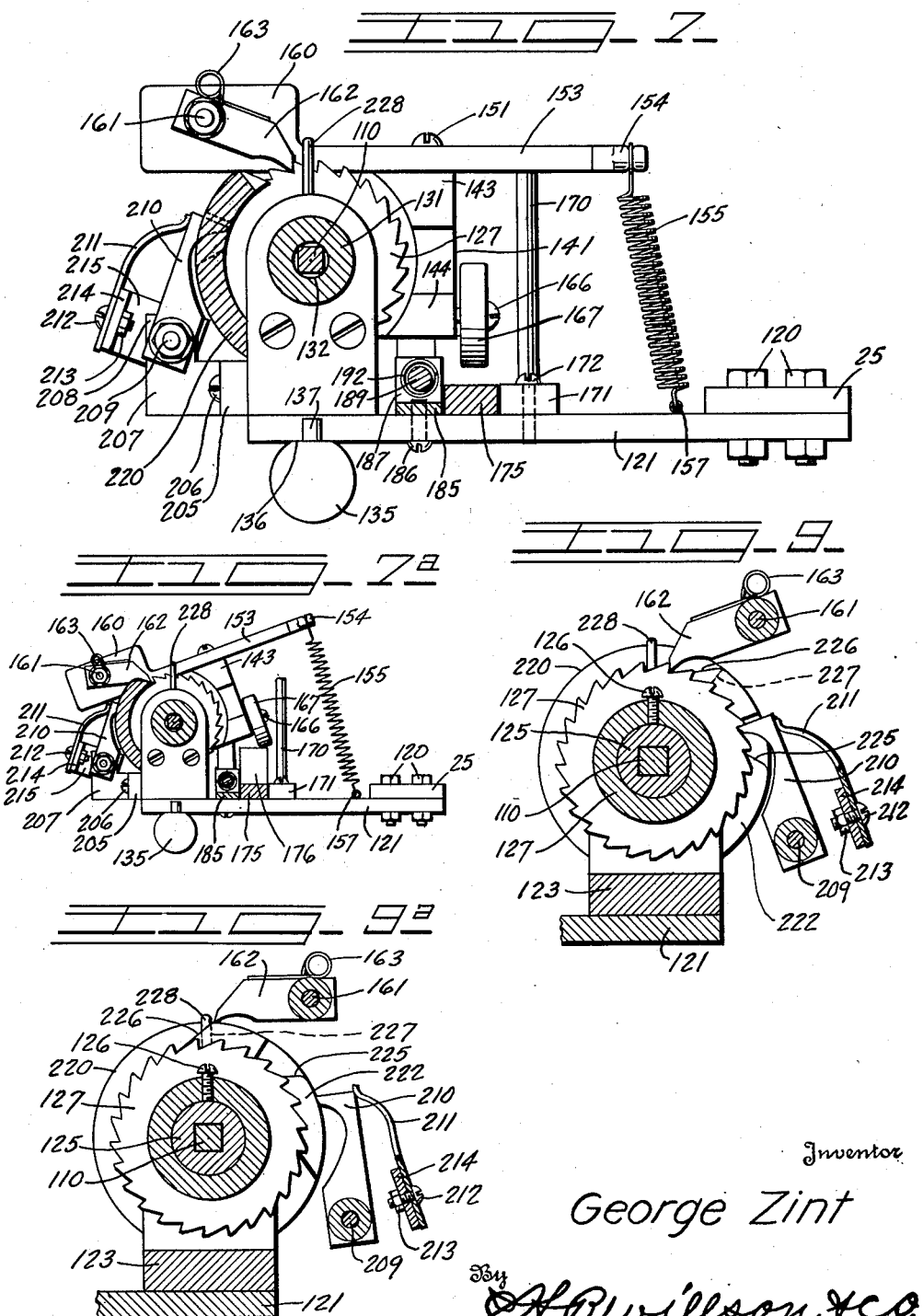

Patented Dec. 18, 1951

2,578,771

UNITED STATES PATENT OFFICE 2,578,771

TYPEWRITER FOR WRITING CONTINUOUSLY IN OPPOSITE DIRECTIONS

George Zint, Wapakoneta, Ohio

Application October 28, 1948, Serial No. 57,058

20 Claims. (Cl. 197—82)

This invention relates to typewriters and more particularly to a power driven machine which will write continuously from left to right and from right to left so that every other typed line must be read backward or from right to left. While such a typewriter is a radical departure from machines now in use, it has certain advantages which will be hereinafter pointed out.

The invention embodies a machine in which the platen-carried carriage is continuously reciprocated at a constant speed in both directions by an electric motor or other driving means, and in which the rotary platen is automatically turned for the spacing of the lines of typed matter at each end of each reciprocation of the carriage. Hence in using the machine all the operator need do is to insert the paper and manipulate the keys.

The invention also embodies in a machine of this character, means for producing an intermittent audible signal which indicates the speed of travel of the reciprocating carriage and hence indicates to the operator when the keys are to be struck so that the operator may cause the desired spacing between the letters of words and between words and sentences, or other typed matter.

The invention further embodies in a machine of this character manually operated means for rendering the automatic line spacing means inoperative to permit the platen to be manually rotated for the insertion and removal of paper or for other purposes.

The object of the invention is the provision of a typewriter of the above mentioned character which will have few parts of simple construction and hence may be produced at a lower cost than typewriters now in use, which will be easy on the operator, and which will effect a saving in time as compared with present day machines.

The invention resides in the combinations of elements, arrangements of parts and features of construction, all as will be more fully pointed out hereinafter, and disclosed in the accompanying drawings in which the present preferred embodiment of the invention is illustrated.

In the drawings:

Fig. 1 is a top plan view of one form of mechanism embodying the invention.

Fig. 2 is a front elevational view.

Fig. 3 is a rear elevational view.

Fig. 4 is an enlarged sectional view taken substantially on the line 4—4 of Fig. 1 as viewed in the direction indicated by the arrows.

Fig. 5 is an enlarged top plan view of the mechanism for imparting rotary movement to the platen, certain portions thereof being broken away, and certain concealed elements thereof being indicated in dotted lines.

Fig. 6 is a detail vertical sectional view taken substantially along the line 6—6 of Fig. 5 as viewed in the direction indicated by the arrows.

Fig. 7 is a sectional view taken substantially along the line 7—7 of Fig. 5 as viewed in the direction indicated by the arrows.

Fig. 7a is a view similar to Fig. 7, on a reduced scale, showing certain operative parts of the mechanism in a different position of adjustment.

Fig. 8 is a sectional view taken substantially along the line 8—8 of Fig. 5, certain portions thereof being broken away, and certain concealed elements being indicated in dotted lines.

Fig. 8a is a sectional view similar to Fig. 8, on a reduced scale, but taken on lines 8a—8a of Fig. 5, certain of the operative parts of the apparatus being disclosed in a different position of adjustment from those of Fig. 8.

Fig. 9 is a sectional view taken substantially along the line 9—9 of Fig. 5 as viewed in the direction indicated by the arrows.

Fig. 9a is a view similar to Fig. 9 but disclosing certain operative elements in a different position of adjustment.

Figs. 10, 11 and 12 are perspective views of certain constructional details.

Fig. 13 is an enlarged sectional view taken substantially along the line 13—13 of Fig. 1.

Fig. 14 is a perspective view of a further constructional detail.

Fig. 15 is an enlarged sectional view taken substantially along the line 15—15 of Fig. 3 as viewed in the direction indicated by the arrows, and Fig. 16 is an enlarged perspective view of a further constructional detail, certain concealed portions thereof being indicated in dotted lines.

Similar reference characters refer to similar parts throughout the several views of the drawings.

The illustrated embodiment of the invention has been built on a No. 9 Oliver typewriter made by Oliver Typewriter Company of Chicago, Illinois. The keys, the type bars operated by the keys and other parts of the typewriter not essential for an understanding of the invention have been omitted from the drawings for the sake of clearness. The main frame of the typewriter is shown conventionally in broken lines, and only the rotary platen and its reciprocating carriage with the supporting and guiding tracks for the latter are shown in full lines. It is of course to be understood that these old parts may take various forms.

Most of the new operative parts of the invention are supported from a C-shaped support or frame member 20 which may be fastened to the main frame 24 of the typewriter at a plurality of places but as shown in Figs. 1 and 4, its ends are secured by bolts 21 and nuts 22 to an upright intermediate bar or flange 23 of the frame 24. Main supporting member 20 has positioned transversely thereacross a plate or bar 25, one end of which extends a substantial distance outwardly of the typewriter frame and serves as a support for mechanism to be more fully described hereinafter. The other end of bar 25 is provided with a depending flange 26, adapted to be secured by means of suitable bolts passed through apertures 27 in one side of main support 20. Secured upon the end of bar 25 adjacent depending flange 26 as by means of bolts 28 is a transversely extending supporting bar or member 29, provided with an upwardly turned extremity 30 (see Fig. 3), to which is secured as by bolts 31 and nuts 32 a suitably shaped mounting plate 33 for a power unit. The latter preferably comprises a suitable constant speed electric motor 37 with a speed reduction gear 37a and a constant speed driven shaft 38. The unit has attaching brackets 36 secured by bolts 34 and nuts 35 to portions of plate 33. The unit also includes a motor control switch 44 with a pivoted operating lever 43. Fixed to shaft 38 is a sleeve 39 having secured to it by a set screw 41 a cylindrical collar 40 carrying a pin 42 which is disposed eccentrically with respect to the power motor shaft 38 and the purpose of which is to drive the mechanism to reciprocate the typewriter carriage as described below.

Main frame member 20 is provided with oppositely aligned pairs of holes 55 through which pass bolts 56 to secure oppositely disposed upright offset brackets 57 provided at their upper ends with bearings 58 in which are mounted the ends of a shaft 59. Shaft 59 carries a pair of collars 60 secured by set screws 61, the collars 60 comprising the ends of cylindrical member 62 having cross or double screw threads cut in the surface thereof. This cross or duplex screw 62 serves to move a cam follower or nut member, to be more fully described hereinafter, linearly from one collar 60 to the other, the direction of travel of the member being reversed by the contour of the helix coacting with an inclined surface 63 on each collar 60.

The end of shaft 59 adjacent motor 37 carries a sleeve 64 provided at its extremity with a collar 65 carrying a radially extending pin 66, which projects into the path of rotation of pin 42 in perpendicular relation therewith. It is to be noted that sleeve 39 is in substantial longitudinal or axial alignment with shaft 59 and hence when the drive shaft 38 is rotated eccentric pin 42 will move pin 66 to rotate the shaft 59 and hence the cross screw 62. The latter operates a traveling or reciprocatory member operatively connected to the carriage as hereinafter described.

The rotary movement of shaft 59 is also used to operate the audible signaling means which will now be described. Sleeve 64 carries adjacent collar 65, a second relatively large collar 67 which is provided with an annular series of equally spaced radial pins 68. In the illustrated embodiment four pins are shown but the number may be varied as desired. Pins 68 are, as best shown in Fig. 13, adapted to engage the underside of a swinging striker 70 mounted by a pivot 71 on a post 72 secured as by a bolt 73, to the top surface of bar 29. A coiled spring 74 serves normally to bias member 70 downwardly to hit an anvil or sounding member 75, carried at the top of a post in the form of a bolt threaded in an opening in bar 29 and secured by a lock nut 77. The anvil 75 may be a piece of hard wood or other material set in a socket at the top of the post so that a dull sound or click will be produced when it is hit by the striker. It will thus be seen that when the shaft 59 is rotated by motor 37 in the manner previously described pins 68 will successively raise striker 70 to the dotted line position disclosed in Fig. 13 and then release it so that spring 74 will pull it down to strike anvil 75 to produce a sound or signal. Obviously equal spacing of the pins will produce equally spaced audible signals, the interval between signals being governed by the speed of rotation of shaft 59 and its associated helical screw 62. Since the speed of rotation of screw 62 governs, in a manner to be more fully pointed out thereinafter, the speed of travel of the typewriter carriage and its platen, it will be readily apparent that the frequency of the audible signals will be indicative of the speed of travel of screw 62 and consequently of the speed of the longitudinal movement of the typewriter platen.

On screw 62 is a traveling nut member or follower 80 which comprises a collar slidably surrounding the screw and having a radial bore 81 within which is seated a cam follower including a cylinder 82 adapted to rotate within the bore and a flat lower tooth 83 having a concave under surface 84. Tooth 83 is adapted to travel in the helical grooves in screw 62, the rotative movement of cylinder 82 permitting either groove to be followed selectively as the tooth is turned by the previously mentioned angled surfaces 63 at the ends of the duplex or crossed threads of the screw. An arcuate cover plate 85, secured to sleeve 80 by means of screws 86, is adapted to cover bore 81 and hold the tooth in the helical grooves, a spacing washer 79 being secured to the top of cylinder 82 to fill the bore 81.

While the carriage may be continuously reciprocated by various means, it has been found that the cross or duplex screw 62 with its traveling member 80 connected to the carriage is entirely satisfactory.

As best shown in Fig. 15 collar 82 has threadedly secured thereto a pin 87 which extends radially and forwardly into the space between blocks 88 secured as by bolts 89 to the upper surface of an offset bracket 90 attached to the typewriter carriage as seen in Fig. 4. A transversely extending plate 91 secured in position as by bolts 92 to the blocks 88, precludes vertical displacement of pin 87 from the channel formed between said blocks.

The opposite and front end of offset bracket 90 is secured as by means of bolts 95 to a forwardly and rearwardly extending plate 96 which is in turn secured by bolts 97 to a bar 98 forming a portion of a conventional typewriter carriage. As best shown in Fig. 4, the carriage includes upright end plates 99 having bearings for an axle or shaft 100 upon which is secured a conventional typewriter platen 101. The carriage travels in a conventional manner on front and rear grooved rollers 102 and 103 running on front and rear cylindrical tracks 104 and 105 respectively. These tracks are supported as seen in Fig. 4 by portions of the typewriter frame 24. A rectangular bar 106 is also provided between end plates 99 upon which slides a member 106' having a bearing for the axle of the single rear roller 103. The other end of the axle of this roller may be fixed to the bracket 90. On the end of the platen shaft 100 adjacent the motor is a conventional knurled knob 117 for manual rotation thereof.

From the foregoing it will now be seen that rotation of screw 62 will impart continuous reciprocatory motion to the carriage of the typewriter and its platen 101. It will additionally be seen that if a key is struck at each sound of the previously described audible signaling means, accurate spacing of letters may be accomplished, and that when a longer space is desired, as between words or between sentences, it is only necessary to refrain from striking a key for one or more audible signals, thus doing away with the necessity for a space bar as in conventional machines. Likewise when the platen is traveling from left to right the matter printed by the typewriter will appear in normal fashion, but when the platen is traveling in the opposite direction from right to left the order of the letters will be reversed, and consequently the line will be read backwards or from right to left, doing away with the necessity for switching the eyes all the way back from the right to the left side of the sheet.

At the right hand side or end of the machine is illustrated the preferred manner of causing the platen to be automatically turned for line spacing at each end of each travel of the carriage; and also manually operated means for throwing out of operation the automatic step-by-step platen turning means when it is desired to insert or remove paper or for other reasons. Briefly the automatic line spacer embodies a pawl and ratchet mechanism associated with an extension of the platen shaft to turn it step-by-step and means actuated by the movement of the carriage to operate said mechanism to cause the platen to be turned at each end of each longitudinal movement of the carriage.

Referring now to the line spacing mechanism it will be seen from Fig. 1 that on the right hand end of the platen shaft is a sleeve 108 secured by a set screw 107 and in the sleeve is secured by a set screw 109 a square shaft 110 forming an extension of the platen shaft 100. Secured as by bolts or rivets 120 to the extended end of bar 25 is a plate 121 which extends forwardly to a point under the platen shaft extension 110.

The end of track 104 has secured thereto a cylindrical rod 135 (see Figs. 3, 6 and 8) having a flat portion 136 to underlie the extremity of plate 121 and serve as an additional support therefor, a pin 137 serving as further aligning and securing means.

Secured on top of plate 121 by screws 122 is a U-shaped bearing or supporting member 123 the legs of which have aligned cylindrical openings 124 to rotatably receive shaft 110 as seen in Fig. 6. A cylindrical sleeve 125 having a square central opening to slidably but non-rotatively receive shaft 110, is positioned between the legs of support 123, and on that sleeve is a ratchet wheel 127 having a hub secured to the sleeve by a set screw 126. The ratchet wheel is thus rotatably supported and when turned will cause shaft 110 and hence platen 101 to turn.

Suitably secured on opposite sides of the legs of supporting member 123 are a pair of plates 130 and 130a provided with cylindrical bosses 131 and 131a respectively. These bosses have cylindrical bores 132 therethrough, the bores being in alignment with the bores 124 and rotatably receiving shaft 110. It will thus be seen that, as best shown in Fig. 6, shaft 110 extends entirely through the assembly and is longitudinally movable with respect thereto, but that partial rotation of ratchet wheel 127 will be imparted to shaft 110.

The ratchet wheel is actuated for line spacing by a pawl on a swinging carrier or lever member which will now be described. Rotatably mounted on boss 131 is a sleeve 140 formed integral with an irregularly shaped member generally indicated at 141 in Fig. 11. This member 141 includes a plate 142 having a flat top and at its rear portion laterally projecting upper and lower lugs 143 and 144 respectively. The front or inner sides of lugs 143 and 144 are of concavely arcuate configuration, adapted, when the parts are in related assembly (see Fig. 7), to be opposite to and spaced from the teeth of ratchet wheel 127. An outer collar 145 secured by a set screw 146 to the projecting end of bearing boss 131, retains the plate-sleeve 140 on said boss while permitting it to rotate. A second collar 147 having a radially projecting lug or finger 202 the purpose of which will be hereinafter explained, is rotatably adjustable on sleeve 140 and is secured thereto by a set screw 148 as seen in Figs. 5 and 6. The collar 147 overlies and rotates on a portion of collar 145.

The flat tops of plate 142 and its upper lug 143 have adjustably secured thereon a flat plate or bar 153 of generally rectangular shape, the connection taking the form of a screw 151 passing through a slot 152 in plate 153 and engaging a threaded socket 150 in the top of lug 143. The rear end of plate 153 extends a substantial distance over plate member 121 and terminates in an extension 154 to which is secured one end of a coil spring 155, the opposite end of which is secured to an eye 157 carried by the upper surface of plate 121. The opposite end of plate 153 is provided with an upstanding lug 160 upon which is pivotally mounted as by a pivot 161, a ratchet dog or pawl 162 biased, as by means of a spring 163, into normal engagement with ratchet wheel 127.

The lower lug 144 has a horizontal threaded bore 165 in which is secured a screw 166 serving as an axle for a rotatable wheel 167. It will thus be seen that raising of the plate 153 by means of wheel 167, in a manner to be more fully described hereinafter, will cause pawl 162 to move rearwardly on ratchet 127, while release of the means elevating the mechanism will permit spring 155 to bias the assembly downwardly and hence the engagement of pawl 162 with ratchet 167 will partially rotate the latter, and consequently the platen 101. A vertically extending rod 170 secured to a block 171 mounted on plate 121 by means of screw 172 serves as a stop to limit downward movement of plate 153.

It is to be noted that plate 153, plate 142 and its sleeve or hub 140 and finger carrying sleeve 147 are rigidly connected together to move as a single unit, and that they constitute a swinging lever or carrier for the ratchet actuating pawl 162, the unit pivoting on the bearing hub 131 and being moved in one direction by the spring 155.

The means for moving the pawl carrier in the opposite direction may take the form of a reciprocating cam 176 connected to and movable with the typewriter carriage and adapted to engage and lift roller 167 during each travel of the carriage. Cam 176 is an arcuate raised portion on a bar 175 (see Fig. 12) having one end secured by a bolt 179 to a plate 180 secured to the adjacent end wall of the carriage as seen in Fig. 1.

When cam 176 lifts the pawl carrier during each travel or longitudinal movement of the carriage, pawl 162 is moved back on the ratchet wheel preferably the distance of one tooth for the single spacing of lines of typed matter, and the carrier is then held in its lifted position until it is tripped at the end of a travel of the carriage and released so that spring 155 will pull the carrier down to cause the pawl to advance the platen for line spacing. The preferred form of tripping means is best shown in Fig. 8a and comprises a slidable trip finger 199 to support finger 202 on the carrier and hold the latter elevated, said trip finger being adjustably clamped on a spring pressed rod 189 slidable on the supporting frame and adapted to be actuated by two spaced tripping dogs 178 and 182 which are movable with the carriage. These parts will now be described in detail. The tripping dog 182 as seen in Fig. 5 is in the form of an adjustable stop screw threaded through an opening in a plate 181 secured by screws on top of plate 180, a set screw 183 being provided to lock said dog in its adjusted position. The other tripping dog 178 is also in the form of a stop screw threaded through the short arm of an L-shaped block 177 having its long arm secured by screws to the extended end of the cam carrying bar 175, a lock nut being provided on the screw to retain it in adjusted position. These two stops or dogs are in axial alignment with the trip carrying rod 189 as seen in Fig. 1. Rod 189 has its end portions slidable in spaced guide lugs 187 at the ends of a bar 185 extending transversely across the top of plate 121 to which it is secured as shown in Fig. 8a. Fixed to the center of rod 189 is a block 190 and between the latter and the lugs 187 are two coil springs 192 of equal tension surrounding said rod. These springs normally position the trip finger 199 in the path of swinging movement of the coacting finger 202 on the pawl carrier. Finger 199 has its upper portion notched or reduced so that its flat upper extremity 201 is of slightly less width than finger 202. This finger is bored to slidably receive rod 189 and from the bore to its lower extremity it is slit so that it may be adjustably clamped on the rod by a bolt or screw 200 passed through its split lower end. Rod 189 is cylindrical and to prevent it from turning a block 195 is secured by a screw near one of its ends, the block carrying a rod or plate 197 secured by a screw 196 and adapted to slide upon the flat bottom of the cross bar 187 as shown in Fig. 8a.

In order to prevent retrograde rotation of ratchet wheel 127 a spring-pressed pawl 210 is mounted on the frame for engagement with the teeth of the wheel. As best seen in Figs. 2 and 7 a bracket plate 205 is secured as by means of screws 206 to the front edge of U-shaped member 123, and is provided with an extending lug 207 having an upwardly projecting portion 208 upon which is pivotally mounted, as by means of a pivot pin 209, the pawl 210. Pawl 210 is pressed inwardly into engagement with ratchet 127 by means of a leaf spring 211 secured as by a bolt 212 and nut 213 to one leg 214 of an L-shaped bracket member 215, which in turn is secured to portion 208 of lug 207.

From the foregoing the operation of that portion of the platen rotating mechanism so far described should be readily understandable. Assuming the typewriter carriage to be in its extreme left position with plate 153 resting on stop 170 as disclosed in Fig. 7, when the motor is actuated the platen and its associated carriage will travel toward the right as viewed, for example, in Fig. 1. Cam 176 moving with the carriage will engage wheel 167 and swing the pawl carrier on boss 131 to the position disclosed in Fig. 7a. Simultaneously springs 192 will serve to center rod 189 which will move the top surface 201 of finger 199 beneath finger 202, and hold the pawl carrier in its raised position disclosed in Fig. 7a. The parts will remain in such position until the carriage almost reaches the end of its travel to the right when dog 182 will engage the extremity of rod 189 adjacent thereto, whereupon rod 189 will be forced out of centered position against the tension of one of said springs 192 to move finger 199 from under finger 202. Spring 155 will then swing the pawl carrier downwardly to the position shown in Fig. 7. Pawl 162 will simultaneously act against a tooth of ratchet 127 to rotate shaft 110, and consequently platen 101, a distance equivalent to the space between typed lines. When finger 202 is in its lowered position, finger 199 will be pressed against one side or the other of it by one of the springs 192 until the cam again lifts the carrier, whereupon the spring 192 which is under tension will move the trip rod to bring its finger under finger 202 (see Fig. 8a). As the platen is moved by screw 62 from one end of its path of travel to the other, the action above described will be repeated. In other words cam 176 will raise the carrier as the carriage is moved in each direction and the trip will release the carrier when rod 189 is engaged by either of the tripping dogs 178 or 182.

Means are provided for releasing both pawls 162 and 210 from their engagement with ratchet wheel 127 in order to permit manual rotation of platen 101 by means of knob 117 when a sheet of paper is to be inserted in the machine. That is preferably accomplished by providing a knurled knob 220 having a bore 221 adapted to rotate on boss 131a of the plate 130a. The knob or hand wheel 220, as seen in Fig. 10, is provided with an offset portion 222 having an inner arcuate surface 223 adapted to extend over a portion of ratchet wheel 127. That portion 222 is provided with a notch 224 to receive pawl 210 and with a cam surface 225 adapted to disengage said pawl from the teeth of the ratchet wheel when the knob is turned in one direction. Portion 222 is formed with another cam surface 226 adapted to underlie the actuating pawl 162 and lift it from the ratchet wheel when the knob is turned in said direction. A notch 227 is cut in the member 222 to receive a stop pin 228 at the top of plate 130a (see Figs. 5 and 6) to limit the rotation of knob 220 in its pawl retracting movement. When the parts are in the position disclosed in Fig. 9, a partial rotation of knob 220 will cause cams 225 and 226 to lift both pawls away from the teeth of the ratchet wheel as disclosed in Fig. 9a. Obviously with the parts in the position disclosed in Fig. 9a the platen and its extended shaft 110 may be freely rotated, ratchet 127 rotating therewith. Equally obviously, reverse rotation of knurled knob 220 will release the pawls for engagement with ratchet wheel 127 and restore the device to normal operative condition. A collar 230 secured as by a set screw 231 surrounds boss 131 and serves to hold knob 220 rotatably on boss 131.

Upon reference to Figs. 1 and 7 it will noted that cam bar 175 slides on top of plate 121 and is guided in its reciprocatory movement with the carriage by block 171 and one side of the cross bar 185 which carries the lugs 187.

It is believed that the operation of the entire mechanism will be clear from the foregoing detailed description of the construction and operation of the various elements.

It is appreciated that before this machine can supplant typewriters now in use, the general public must be educated to read every other typed line backward or from right to left. However it is believed this machine would be useful as a training or practice machine in schools teaching typewriting. Much paper could be saved by using paper fed from a roll of paper suitably supported on the carriage. A person learning to typewrite would simply have to listen to the audible signals and operate the keys, and hence could gain much speed in striking the keys. If the machine can be brought into general use much time could be saved in doing typewritten work, since the operator would not have to actuate a spacer bar or manually return the carriage at the end of each line. Time would also be saved and there would be less strain on the eyes, if the typed matter is read continuously from left to right and from right to left.

While the present preferred embodiment of the invention has been illustrated and described in detail, it is to be understood that all matter herein is to be interpreted merely as illustrative and not in a limiting sense.

I claim:

1. In a typewriter, a reciprocatory carriage carrying a rotatable platen, power driven means for continuously reciprocating said carriage from left to right and from right to left at a constant speed, means for automatically turning said platen for line spacing at each end of each travel of said carriage, and audible signaling means operating in timed relation with the movement of the carriage to indicate its speed of longitudinal travel.

2. In a typewriter, a reciprocatory carriage carrying a rotatable platen, power driven means for continuously reciprocating said carriage from left to right and from right to left at a constant speed and an audible signaling means operating in timed relation with the movement of the carriage to indicate its speed of longitudinal travel.

3. In a typewriter, a reciprocatory carriage carrying a rotatable platen, a rotary shaft power driven in one direction at a constant speed, mechanical means positively driven from said shaft for continuously reciprocating said carriage from left to right and from right to left at a constant speed and means controlled by the movement of said carriage for automatically turning said platen for line spacing at each end of each travel of said carriage.

4. In a typewriter, a reciprocatory carriage carrying a rotatable platen, power driven means for continuously reciprocating said carriage from left to right and from right to left at a constant speed and means for automatically turning said platen for line spacing at each end of each travel of said carriage, said automatic turning means being actuated by the movement of said carriage as it reaches each end of its travel.

5. The structure of claim 4 together with manually operated means for rendering said automatic turning means inoperative to permit manual turning of said platen.

6. In a typewriter, a reciprocatory carriage carrying a rotatable platen, power driven means for continuously reciprocating said carriage from left to right and from right to left at a constant speed, means for automatically turning said platen for line spacing at each end of each travel of said carriage, a spring for actuating said automatic turning means, and a cam connected with said carriage for controlling the actuation of said automatic turning means by its actuating spring.

7. The structure of claim 1 in which said signaling means comprises an anvil, a movable striker to coact with said anvil and a rotary tappet for actuating said striker, said tappet being driven in timed relation with the movement of said carriage.

8. The structure of claim 1 in which said power driven means includes a cross screw continuously rotated and a reciprocatory member to travel back and forth on said screw and operatively connected to said carriage to reciprocate the same.

9. In a typewriter for writing continuously from left to right and from right to left, a reciprocatory carriage carrying a rotable platen, a motor driven rotary shaft, means actuated from said shaft for continuously reciprocating said carriage at a constant speed, an intermittently operating sound making means actuated when said carriage is in motion to indicate the speed of movement of the carriage, and automatic means actuated by the movement of said carriage for turning said platen for line spacing at each end of each travel of the carriage.

10. The structure of claim 9 in which said automatic line spacing means includes a shaft extending axially from one end of the platen and rotatable therewith, a ratchet wheel slidably but non-rotatively mounted on said shaft, a pawl mechanism to coact with said ratchet wheel, and means for intermittently operating said pawl mechanism to cause it to turn said ratchet wheel at each end of each travel of said carriage, said last-mentioned means including a cam movable with said carriage and a tripping mechanism actuated by the movement of said carriage.

11. The structure of claim 10 together with manually actuated means associated with said pawl mechanism to render said line spacing means inoperative to permit said platen to be manually turned.

12. In a typewriter for writing continuously from left to right and from right to left, a supporting frame, a carriage mounted thereon for reciprocation and carrying a rotatable platen, power driven means for continuously reciprocating said carriage at a constant speed, a shaft fixed to one end of the platen to rotate therewith and axially aligned with the platen, a ratchet wheel slidably but non-rotatably mounted on said shaft, a bearing support fixed to said frame and in which said ratchet wheel is mounted for rotation but held against sliding movement on said shaft, a pawl for forwardly actuating said ratchet wheel to turn said platen for line spacing, a movable carrier for said pawl, a second pawl on said support to engage said ratchet wheel to prevent retrograde movement of said shaft, and means operated by the movement of said carriage for actuating said pawl carrier to cause said first-mentioned pawl to turn said shaft to a predetermined extent at each end of each travel of said carriage.

13. The structure of claim 12 in which said pawl carrier is mounted for swing movement about the axis of said shaft and both of said pawls are pivoted, and in which the last-mentioned means comprises a cam carried by and movable with said carriage for swinging said carrier in one direction to move the actuating pawl rearwardly on the ratchet wheel, a spring for moving said carrier in the other direction to cause the shaft to turn the platen for line spacing, a slidable spring actuated trip on said support to hold said carrier against actuation by said spring, and a pair of spaced tripping dogs supported from and movable with said carriage to coact with said slidable trip to cause it to release said carrier at each end of each travel of said carriage.

14. In a typwriter for writing continuously from left to right and from right to left, a supporting frame, a carriage mounted thereon for reciprocation and carrying a rotary platen, a shaft mounted for rotation on said frame and having its longitudinal axis extending in the direction of movement of said carriage, a cross screw carried by said shaft, a traveling member reciprocable on said screw and carrying an element operatively connected to said carriage to reciprocate the latter, a drive shaft mounted on said frame in axial alignment with said screw shaft, an eccentric pin carried by said drive shaft, a radial pin carried by said screw shaft and disposed in the path of movement of said eccentric pin, and a power unit mounted on said frame for driving said drive shaft at a constant speed of rotation.

15. In a typewriter for writing continuously from left to right and from right to left, a supporting frame, a carriage mounted thereon for reciprocation and carrying a rotary platen, a shaft mounted for rotation on said frame, means on said frame for rotating said shaft at a constant speed, means operated from said shaft for continuously reciprocating said carriage from left to right and from right to left, an annular series of equally spaced radial pins on said shaft, a swinging striker mounted on said frame in the path of movement of said radial pins, and an anvil on said frame to be intermittently hit by said striker to produce an audible signal.

16. In a typewriter of the character set forth, a carriage mounted for reciprocation and carrying a rotary platen, power driven means for continuously reciprocating said carriage, and means for turning said platen for line spacing at each end of each travel of said carriage, said platen turning means including means moved by said carriage.

17. In a typewriter of the character set forth, a carriage mounted for reciprocation and carrying a rotary platen, power driven means for continuously reciprocating said carriage, and means for turning said platen for line spacing at each end of each travel of said carriage, said platen turning means including a pawl and ratchet mechanism for step-by-step actuation of said platen for line spacing, and means controlled by the movement of said carriage for operating said mechanism at each end of each travel of said carriage.

18. In a typewriter of the character set forth, a carriage mounted for reciprocation and carrying a rotary platen, power driven means for continuously reciprocating said carriage, and means for turning said platen for line spacing at each end of each travel of said carriage, said platen turning means including a pawl and ratchet mechanism for step-by-step actuation of said platen for line spacing, said mechanism including a movable trip-controlled member operated by the movement of said carriage, and tripping means for said member actuated at each end of each travel of said carriage to permit said pawl and ratchet mechanism to turn said platen for line spacing.

19. In a typewriter of the character set forth, a carriage mounted for reciprocation and carrying a rotary platen, means for continuously reciprocating said carriage, and means for turning said platen for line spacing at each end of each travel of said carriage, said platen turning means including a pawl and ratchet mechanism for step-by-step actuation of said platen for line spacing, said mechanism including a pawl-carrying lever, a spring for actuating said lever in one direction, a cam moved by said carriage for moving said lever in the opposite direction, a slidable spring-pressed trip to coact with said lever to hold it against actuation by its actuating spring, and space tripping dogs moved by said carriage and coacting with said slidable trip to release said lever at the end of each travel of said carriage.

20. The structure of claim 19 together with manually actuated means for rendering said pawl and ratchet mechanism inoperative to permit manual rotation of said platen.

GEORGE ZINT.

REFERENCES CITED

The following references are of record in the file of this patent:

UNITED STATES PATENTS

| Number | Name | Date |
| --- | --- | --- |
| 996,993 | McCall | July 4, 1911 |
| 1,503,028 | Crawley | July 27, 1924 |
| 2,182,522 | Lindsey | Dec. 5, 1939 |
| 2,217,221 | Ganger | Oct. 8, 1940 |
| 2,411,723 | Hausman | Nov. 26, 1946 |